Jan. 3, 1939.    G. E. ROWE    2,142,955
PROCESS OF AND APPARATUS FOR FORMING HOLLOW GLASS ARTICLES
Filed Dec. 1, 1937    2 Sheets-Sheet 1
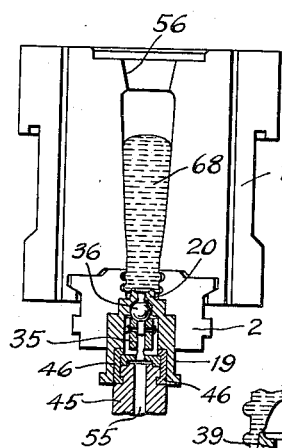
Fig.1.
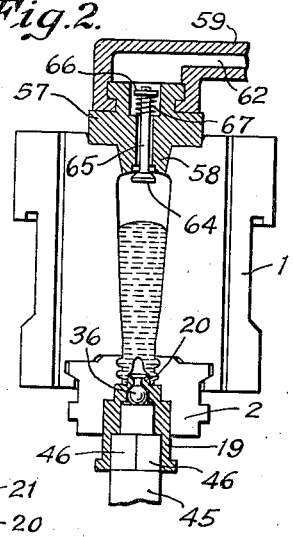
Fig.2.
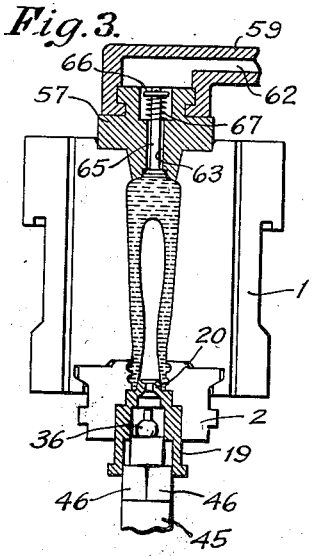
Fig.3.
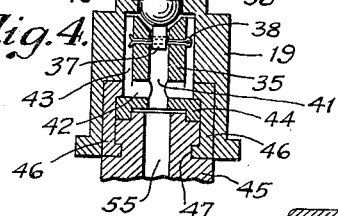
Fig.4.
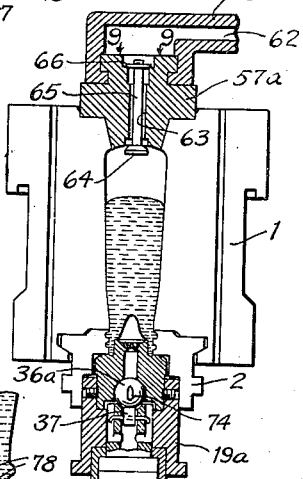
Fig.6.
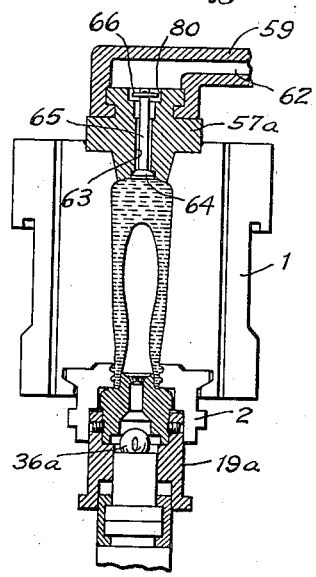
Fig.7.
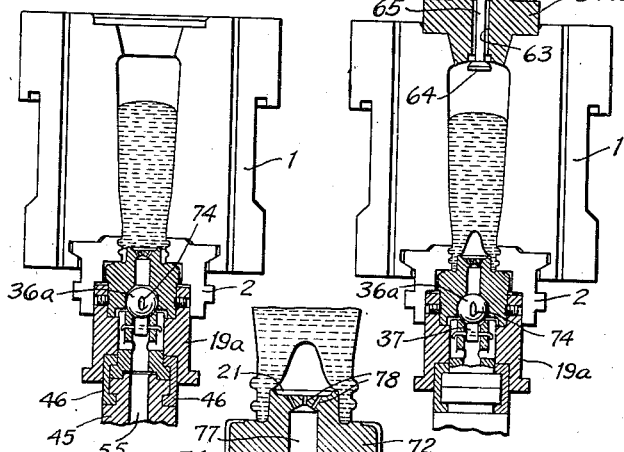
Fig.5.    Fig.8.
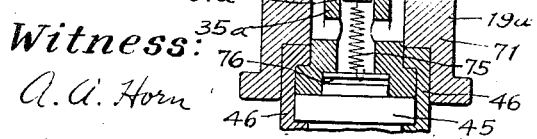
Witness: A. A. Horn
Inventor:
George E. Rowe
by Brown & Parham
Attorneys.

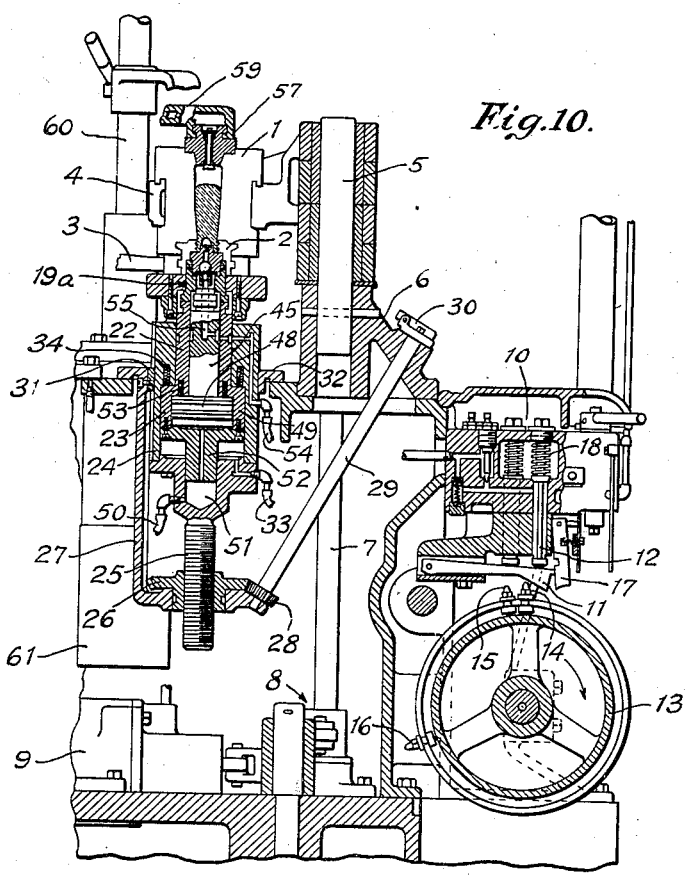

Patented Jan. 3, 1939

2,142,955

UNITED STATES PATENT OFFICE 2,142,955

PROCESS OF AND APPARATUS FOR FORMING HOLLOW GLASS ARTICLES

George E. Rowe, Wethersfield, Conn., assignor to Hartford-Empire Company, Hartford, Conn., a corporation of Delaware Application December 1, 1937, Serial No. 177,407

16 Claims. (Cl. 49—9)

This present invention relates to a process of and apparatus for forming hollowing glass articles, and more particularly to a process and apparatus by which articles may be formed more rapidly than is possible by present commercial processes and with modern commercial apparatus, while at the same time these articles will be free from a common defect known as a "settle wave." As such, the present invention is a continuation in part of my prior copending application, Serial No. 75,156, filed April 18, 1936.

One of the most common defects in hollow glassware made by commercial processes and apparatus is what is known as a "settle wave." In certain well known commercial methods of manufacturing hollow glass articles, such as bottles, a charge of plastic glass is supplied downwardly into the open upper end of an inverted blank mold of larger capacity than the charge and having a neck ring associated with its lower end and a neck pin associated with the neck ring. Settle blowing pressure is then supplied through the upper end of the mold to pack the charge of glass into the neck ring and around the neck pin and to form a finished neck portion of glass.

Subsequent to this operation, the neck pin is withdrawn from contact with the glass and a time period provided at this stage in the process for what is known as "corkage reheat." That is, the glass which has been in contact with the neck pin is permitted time for reheating out of contact with any cooler metallic surface, the heat of the interior portions of the glass soaking through and softening the skin, which has been formed by contact with the neck pin. This has been an essential step in prior practices, due to the fact that it has been impractical to supply blowing pressure to expand the cavity started by the neck pin until the glass bounding that cavity has softened to permit the proper expansion thereof.

However, during this period of time devoted to "corkage reheat", the glass in contact with the blank mold at the sides thereof has, of course, also formed a certain amount of skin, due to heat being abstracted from the surface of the glass faster than heat can flow by conduction through the glass from the hotter central portion of the charge.

Thereafter, counterblowing pressure has been supplied to expand the glass into conformity with the internal cavity of the blank mold and up against a suitable baffle. When this was done according to the prior art, the portion of glass which was previously in contact with the sides of the mold remained substantially stationary, the hotter central portion of the glass body rolling out and contacting with the upper portions of the mold. After the parison thus formed was counterblown, some time was permitted for the glass to form a certain amount of skin, so that the parison might retain the shape imparted to it during the subsequent transfer.

As will be obvious from the above description, the portion of glass initially in contact with the mold during the entire settle blowing and counterblowing had a longer period of contact therewith than that portion which was forced into contact with the mold by the counterblowing operation; and as a result there was a thicker skin formed on the parison for the portion initially in contact with the mold during the settle blowing than on the remaining portion of the parison.

This differential skin thickness was never wholly eliminated so that the articles thus produced had walls of two materially different thicknesses, meeting at a zone around the article. This differential thickness resulted in a visible defect in the glass, which shows up as a wave band surrounding the articles, and is known in the art as a "settle wave". This "settle wave" is not only unsightly, but the differential thicknesses require more glass to provide a given strength to the articles than would be required if the walls thereof were of more uniform thickness. Thus, the "settle wave" has its origin to a major extent at least in the fact that the glass is in contact for a materially longer time with the mold at one portion than at another; and this difference in time of contact is augmented to an undesired extent by the necessity of providing "corkage reheat".

The general object of the present invention is to provide a process and apparatus by which glassware may be made without the objectionable "settle wave" hereinabove referred to, while at the same time providing for the more rapid manufacture of glassware than has been considered possible heretofore, due to the fact that the period of time previously devoted to "corkage reheat" as aforesaid is eliminated according to my present process.

An object of the present invention is to provide for the supplying of a relatively small amount of air through the neck pin substantially at the time a glass charge is introduced into a blank mold for the purpose of forming a bubble in the glass opposite the end of the neck pin and thereby preventing skin formation upon this portion of the glass, so that counterblowing may be initiated not later than the end of the settling operation, with the elimination of the time period heretofore devoted to "corkage reheat".

In this connection, it is a specific object of the present invention to provide for this supplying of air as aforesaid in a manner independent of the glass itself and of any engagement of the glass with any apparatus within or associated with the mold.

A further object of the present invention is to provide a process and apparatus for forming articles as aforesaid in which counterblowing pressure may be applied to expand the glass in the blank mold prior to the cessation of the application of settle blowing pressure, the pressure used for counterblowing being somewhat higher than that used for settle blowing. Specifically in this connection, it is an object to provide apparatus including a normally open valve in a combined settle blow head and counterblowing baffle, through which settle blowing pressure may be introduced for settling the glass, this valve to be mechanically closed by engagement with the glass upon the expansion thereof under the influence of the counterblowing pressure. In this way, there is provided a definite and controlled back pressure within the mold during the counterblowing and a vent from the upper end of the mold, which will be continuously open during the expansion of the glass by the counterblowing pressure.

A further object of the invention is to provide a process and apparatus by which the speed of movement of the glass through the blank mold during the introduction thereof into the mold is retarded by the application into the lower end of the mold of a relatively small amount of air under pressure, preferably in conjunction with the subsequent application of pressure, preferably through the neck pin, to form a cavity in the glass opposite the end of the neck pin, as above set forth. This process and apparatus is particularly advantageous when making semi-wide mouth and wide mouth types of articles by the process generally used in the manufacture of narrow neck type articles.

Further objects and advantages of my present invention will become apparent from the following specification and appended claims when taken in connection with the accompanying drawings, in which:

Figures 1 to 4 illustrate diagrammatically and in vertical section certain apparatus and also various process steps in the formation of a glass blank or parison, which may thereafter be transferred to a final blow mold and blown to form a hollow glass article, such as a bottle, Fig. 1 showing the charging of a blank mold, Fig. 2 the settling of the charge of glass in the blank mold and neck ring and around the neck pin, Fig. 3 the counterblowing of that charge to conformity with the mold cavity, and Fig. 4 being a fragmentary detail showing the construction of the neck pin and certain associated means;

Figs. 5 to 8 inclusive are a series of somewhat diagrammatic views in vertical section, similar to Figs. 1 to 4 respectively, but showing a modified construction of the apparatus, and also illustrating a slightly modified process;

Fig. 9 is a fragmentary detailed view taken substantially on the line 9—9 of Fig. 6;

Fig. 10 is a fragmentary view substantially in vertical section illustrating the adaptation of the commercial "Hartford I. S. machine" for use in carrying out the processes of my present invention; and Fig. 11 is a fragmentary detailed view substantially in vertical section illustrating a portion only of the structure of Fig. 10, and particularly showing certain of the timing means for carrying out the process.

While I contemplate that my invention both from a process point of view and using the same or some equivalent apparatus may be employed in conjunction with many types of machine, I have chosen to illustrate the invention by apparatus which may be used with a now well known commercial machine, known as the "Hartford I. S. machine" and disclosed in substantially its commercial form in the patent to Ingle No. 1,911,119, granted May 23, 1933.

There is illustrated in Figs. 10 and 11 of the present drawings certain of the constructions of the Ingle machine showing the adaptation thereof to the performance of the process of the present application. Reference may also be made to the Ingle patent for a disclosure of the remainder of the machine and for a detailed disclosure of the operation of certain of the parts, which will be only generally described herein.

*The form of the invention of Figs. 1 to 4, inclusive*

Referring to Figs. 1 to 4 of the accompanying drawings, I have shown a conventional I. S. type blank mold at 1, which may correspond to the blank mold of the Ingle patent above referred to and positioned and be operated substantially as shown in Fig. 10 of the present drawings. Associated with this mold in the present case is a divided neck ring 2 which may be of conventional form and may be constructed, mounted and operated in the same manner as disclosed in the Ingle drawings. According to that disclosure and as shown in Fig. 10, the halves of the neck ring 2 are mounted in arms 3, the opening and closing means for the neck ring and the moving means for the arms 3 in inverting a parison to transfer it from the blank mold 1 to a blow mold (not shown), being substantially as disclosed in the aforesaid Ingle patent.

The mold 1 is made in complementary halves, each of which is supported in a mold holder 4 mounted on the end of a suitable arm, the arms being pivoted about a common vertical shaft 5, which is mounted in a supporting bracket 6 on the main frame of the machine. Suitable means, including a pair of vertically disposed rock shafts 7, only one of which is shown, are provided for opening and closing the blank mold, these rock shafts being connected through a linkage generally indicated at 8 to the piston of a pneumatic cylinder 9.

The various operating mechanisms of the machine are all pneumatically operated by suitable air motors, certain of which are shown in Fig. 10. Pressure for operating all these air motors is under the control of a timing means, shown at the right in Fig. 10. This means is substantially the same as that particularly set forth in an earlier Ingle patent, No. 1,843,159, and comprises generally a bank of valves 10, one of which is associated with each of the pressure supply lines to an operating mechanism of the machine. Each of these valves has an independent operating means including a lever as shown at 11, which is adapted to be actuated to move the valve between a closed position, in which pressure from the associated mechanism is permitted to exhaust to the atmosphere around the stem 12 of the valve, and an open position, in which the valve stem is raised by the upward movement of the lever 11. Below the bank of valves 10 is a rotary drum 13, which is driven by suitable mechanism, not shown. The drum has an undercut groove opposite each of the valves and its operating mechanism, including the lever 11. In each of these grooves there are adapted to be located one or more buttons as shown at 14, 15 and 16. The button 15 is a short button and is adapted upon engagement with the lever 11 to move it upwardly to open the associated valve to such a point that a latch member 17 having a notch therein, as shown, may engage a projecting portion of the member 11 and hold the valve open. The buttons 14 and 16 are long buttons and are so arranged as not only to raise the lever 11 associated therewith to the point where the projection might engage in the notch of the associated latch 17, but also after passing the contacting portion of the lever 11, to engage the lower end of the latch 17 to trip it and thus permit the associated valve to be closed under the influence of a spring 18 concentric with each valve stem.

Thus, when it is desired to admit pneumatic pressure through a particular valve for a certain definite time, a short button first engages the associated lever 11, opening the valve to admit pressure from the source to the associated mechanism. The lever 11 will be held in position to retain the valve open by the latch 17 until this latch is subsequently engaged by a succeeding long button in the same groove of the drum 13. At this time, the latch will be tripped and the valve closed by the spring 18, so as to cut off further supplying of pressure to the associated mechanism and to exhaust pressure from that mechanism through the supply line and through the valve to the atmosphere.

When, however, it is desired that pressure be supplied only momentarily for a certain purpose as hereinafter defined, a long button only may be used, which will actuate the lever 11 to open the valve momentarily and then immediately thereafter will trip the latch 17 to permit the closing of the valve. This is the function of the long button 14 shown in Fig. 10.

Associated with the lower end of the mold 1 in the form of the invention shown in Figs. 1 to 4 and best illustrated in Fig. 4 is a neck pin structure 19 having a neck pin portion 20 at its upper end. The upper end of the neck pin portion 20 is formed with a reentrant cavity 21 which may serve as set forth in my prior and copending application to trap a volume of air once the glass has moved downwardly in the mold until it engages the peripheral part of the neck pin bounding the depression or cavity 21. This air may be sufficient to prevent skin-forming contact between the central portion of the end of the neck pin and the glass opposite it, so that upon the completion of settling of the glass, counterblowing pressure may be supplied through the neck pin, as hereinafter set forth and as set forth in my copending application, to counterblow the charge without the necessity of waiting for a period of corkage reheat.

Referring now to Fig. 10, the neck pin structure is indicated at 19a, corresponding to the structure 19, but specifically illustrating the equivalent mechanism shown in Figs. 5 to 8 of the accompanying drawings. This structure 19a, Fig. 10, is mounted upon the upper end of an annular substantially cylindrical member or sleeve 22, which is formed at its lower end with a piston portion 23, the latter being received within a cylinder 24. At its lower end, the cylinder 24 has a head provided with a depending stem 25 which is threaded in a nut 26 swiveled in a supporting bracket 27 carried by the base or frame of the machine.

When it is desired to adjust the neck pin structure and all associated means hereinafter described, the nut 26 is rotated in respect to the stem 25. For this purpose, the outside of the nut is provided with beveled gear teeth in mesh with a beveled gear 28 mounted upon an inclined shaft 29 journaled in the frame of the machine and a part of the bracket 27 and having a means 30 at its upper end by which it may be rotated. The cylinder 24 has a splined connection illustrated at 31 with a supporting ring 32 carried by the frame of the machine, so that rotation thereof is prevented while permitting the vertical adjustment thereof when the shaft 29 is rotated to rotate the nut 26.

Means are provided for moving the piston portion 23 vertically in the cylinder 24 to move the neck pin structure 19a into and out of cooperative relation with the neck ring 2. For this purpose, pneumatic pressure may be supplied to the underside of the cylinder 24 through a pipe 33 from the timer above described, a portion of the pipe being flexible to permit of the vertical adjustment of the neck pin and its associated means, as above described. The piston 23 will be moved upwardly to position the neck pin in its operative position in respect to the neck ring upon the supplying of pressure through the pipe 33. When it is desired to withdraw the neck pin downwardly, the pressure through the pipe 33 is exhausted and the piston 23 moved downwardly in the cylinder 24 under the influence of compression springs 34 located in an annular groove in the upper head of the cylinder 24 above the piston 23 and bearing thereagainst.

Within the neck pin structure 19, as best seen in Fig. 4, is a member 35 carrying at its upper end a ball valve 36 which has a depending stem portion 37 loosely connected to the upper end of the member 35 by a cotter pin 38 passing loosely thrugh a vertically elongated slot in the depending portion 37. Thus, the ball valve 36 has a certain freedom of movement in a vertical direction in respect to the member 35. At its upper end the ball valve 36 has a projecting portion 39 which extends loosely through an aperture axially of the neck pin 20, the upper end of the projecting portion 39 being substantially flush with the lower part of the depression 21 in the end of the neck pin when the ball valve is at its uppermost position. The ball valve 36 is adapted at its uppermost position to seat against a beveled annular surface 40 within the neck pin structure 19 to cut off flow of pressure at this point. When, however, the ball valve is at its lower position, pressure may flow momentarily around the valve and through the passage or bore in the neck pin around the projecting portion 39. The member 35 is provided with a longitudinal bore 41, and with one or more lateral bores 42 communicating therewith and with a pair of longitudinal slots 43 between this member and the wall of the cavity within the neck pin structure 19.

Thus, when pressure is supplied through the passage 41, it will pass upwardly and some of this pressure will flow past the ball valve 36 and around the projecting portion 39 into the cavity 21 in the end of the neck pin. However, when this pressure is applied as aforesaid and the ball valve 36 is initially at its lowermost position under the influence of gravity, only a small amount of pressure will flow through the neck pin prior to the closing of the valve, the pressure continuously applied operating to force the ball valve to its uppermost or closed position, so as to cut off the further application of pressure until the member 35 is bodily moved downwardly, as seen in Fig. 3, to withdrawn the ball valve 36 completely from its seat and to withdraw the portion 39 completely out of the bore in the neck pin.

In order to provide for the aforesaid bodily movement of the member 35, it is provided at its lower end with a flange 44 which is connected to the upper end of a hollow stem 45 by a pair of complementary semi-cylindrical members 46, which have upper and lower inwardly extending flange portions engaging over the flange 44 and also in an annular groove 47 formed around the hollow stem 45. When the parts are in assembled relation, as shown in Fig. 4, the members 46 have substantially the same outside diameter as that of the hollow stem 45 and are prevented from becoming dislodged by being enclosed within a cylindrical cavity in the lower part of the neck pin structure 19.

As shown in Fig. 10, the hollow stem 45 is mounted for vertical movement within and concentrically of the hollow cylindrical member or sleeve 22 and carries at its lower end a piston member 48 arranged to operate in a cylinder 49 formed within the piston 23. For operating the piston 48 in the cylinder 49, pressure may be conducted to the lower end of the cylinder through a pipe 50 from the timer, the pipe extending to a well 51 formed in the lower head of the cylinder 24 and communicating with the inside of the cylinder 49 through a bore in a stem 52 carried by the lower head of the cylinder 49 and sliding in the well 51. Thus, when pressure is supplied through the pipe 50 from the timer, the piston 48 will be moved upwardly in the cylinder 49 to position the parts as shown in Fig. 4. When it is desired to withdraw the ball valve 36 from its seat so that the parts will be positioned as shown in Fig. 3, pressure is exhausted through the pipe 50 so that a series of compression springs 53 positioned in an annular groove of the upper head of the cylinder 49 above the piston 48 may move that piston downwardly to move the stem 45 downwardly.

Means are provided for supplying pressure from the timer to the interior of the hollow stem 45. For this purpose, pressure may be supplied from the timer through a pipe 54 and through a series of passages shown in Fig. 10 in the various parts, these passage communicating with a bore 55 in the hollow stem 45. Where these passages go through parts which have a certain movement as aforesaid, such as the passage from the port through the sleeve member 22 to the interior of the stem 45, an elongated slot is formed in one of these relatively movable parts, so that pressure may communicate with the passage 55 at all positions of the stem 45. On the other hand, it is only desired to transmit pressure to the interior of the stem 45 when the neck pin structure 19 or 19a is at its uppermost position. Thus, the passages between the port in the wall of the cylinder 24 and that passing through the sleeve 22 are only in registry at this time. Pressure is supplied from the timer to the pipe 54 at suitable times, as hereinafter more specifically described.

The construction at the upper end of the blank mold, as shown in the present drawings, is somewhat different from that disclosed in the Ingle patent above referred to, in that the upper end of the blank mold is formed with a funnel shaped portion 56 and the use of the separate funnel is eliminated. There is provided a head 57 which serves both as a settle blow head and as a counterflow baffle, this head having a tapered portion 58 adapted to seat in the funnel shaped portion 56 of the blank mold. This head is carried by a laterally extending arm 59 and is operated in the same manner as the settle blow head of the Ingle patent, except that it need not be raised after the settle blowing for the removal of the funnel and then placed down again onto the top of the mold, as disclosed in that patent and as used in the commercial machine. The reason for this change is that in the present instance there is substantially no time interval between the settle blowing and the counterblowing, and in fact, as hereinafter set forth, there may be an overlapping of these two time periods to a certain extent; whereas in the "I. S. machine", as disclosed in the Ingle Patent No. 1,911,119, there is a time interval between these two operations, which is used for corkage reheat, as above set forth.

The head 57 is shown diagrammatically in Fig. 10. The arm 59 carrying this head is suitably vertically adjustably secured to a shaft similar to the shaft 60 shown in Fig. 10, which is the shaft normally used in the "I. S. machine" for the funnel. The shaft carrying the head 57 is not shown in the accompanying drawings, but corresponds in its mode of operation and functioning to the operation and functioning of the shaft 60, which is the piston rod associated with a pneumatic cylinder 61. The operation is such that the head 57 is given a combined movement, there being a vertical movement imparted directly by a cylinder corresponding to the cylinder 61 and under control of the timer and a lateral helical movement in response to the vertical movement and controlled by a suitable cam means effective at the upper end portion of the stroke of the piston in the cylinder. Thus, in moving the head 57 away from its operative position on the mold, it is first raised vertically sufficiently to clear the upper end of the mold, then swung in a helical path to its inoperative position.

The arm 59 is hollow to provide a blowing passage 62 for settle blowing air, which passage communicates with a suitable bore 63 through the head 57. At the lower end of this bore, as shown, is arranged a poppet valve 64, which when closed, Fig. 3, has its lower end flush with the lower end portion 58 of the head 57 so as to form a complete baffle against which the glass may be expanded. The head 64 of the valve is carried by a stem 65 having a suitable abutment 66 at its upper end. Extending between the abutment 66 and a shoulder in the head 57 around the stem 65 is a compression spring 67. Thus, when settle blowing pressure is supplied through the passage 62 from the timer, the valve 64 will be opened under the influence of the pressure and against the compression of spring 67. When this pressure is relieved, the spring 67 will move the valve to its closed position.

The operation of the device as shown in Figs. 1 to 4 is as follows: A charge of glass 68 is supplied to the blank mold 1 through its open upper end, the head 57 being at this time in its inoperative position, raised and to one side of the opening of the blank mold. At this time, the neck pin structure 19 is at its raised or operative position, as shown in Fig. 1, and the member 35 is at its uppermost position, as shown in that figure. There is, however, no pressure being supplied through the passage 55 of the stem 45 prior to the time the charge of glass is introduced into the mold.

At about the instant the charge of glass moves into the mold and the bottom end of the charge comes into engagement with the upper end of the neck pin, counterblowing pressure is supplied through the passage 55 as aforesaid from the timer, which will be effective to cause a small amount of air to flow past the ball valve 36 and form a cavity in the glass opposite the end of the neck pin. This step of the operation is shown in Fig. 1. The air supplied at this time will insure that the glass will not contact with the center portion of the end of the neck pin and thus will prevent skin-forming contact of the glass therewith. As soon as the small amount of air has passed through the neck pin to form the cavity as aforesaid, the continued application of pressure through the passage 55 from the timer will cause the ball valve 36 to seat and cut off further flow of pressure through the neck pin.

Thereafter, settle blowing pressure is supplied through the passage 62 and through the head 57 to settle the glass, as shown in Fig. 2. This will force the glass downwardly into the neck ring and around the neck pin, as shown in Figs. 2 and 4. The air within the depression previously formed in the glass will, however, expand to some extent under the influence of the heat of the glass and form a depression in the glass substantially as shown in Figs. 2 and 4.

As soon as settle blowing has ceased, in this form of the invention, the member 35 is retracted to the position shown in Fig. 3 and counterblowing pressure, which has been continuously supplied to the interior of the neck pin structure 19, will now be permitted to flow through the neck pin to expand the glass into conformity with the cavity of the mold, as shown in Fig. 3. Thus, the counterblowing operation proper is initiated not by a control of pressure, but rather by the mechanical operation of withdrawing the member 35 downwardly and thus moving the ball valve 36 from its seat to permit the pressure to flow through the neck pin.

It is noted particularly that the operation of forming a depression in the glass by the supplying of pressure through the neck pin substantially simultaneously with the arrival of the glass in the lower end of the mold is accomplished in a manner independent of the glass. As a practical matter, this is accomplished by the provision of a single short button, as shown at 69 in Fig. 11, positioned in the appropriate groove to apply counterblowing pressure at substantially the instance the glass arrives at the proper point in the mold. Inasmuch as the button 69 can be adjustably positioned at any desired point around the periphery of the drum 13, this action may take place at a desired time. The associated longer button 70, Fig. 11, may be used to cut off the supplying of counterblowing pressure at the desired time prior to the opening of the mold 1 for the transfer of the hollow blank or parison formed therein to a final blow mold for final blowing.

*The invention shown in Figs. 5 to 8, inclusive*

In this form of the invention, the mold 1 and neck ring 2 may be constructed and operated as above set forth. The neck pin structure 19a, however, is somewhat different from that previously described in that it is made in two parts, there being a lower part 71 and an upper part 72 interchangeably mounted in the lower part by means of set screws 73, Fig. 8. This construction is somewhat cheaper and permits the maintenance of certain desired operating conditions, particularly as to temperature. Within the neck pin structure 19a, which is operated as above set forth for the neck pin structure 19 and as particularly shown in Fig. 10, is a member 35a, generally similar to the member 35, but having certain slight differences. The member 35a is mounted on the hollow stem 45, as previously described for the member 35 and by the use of split collar members 46.

A ball valve 36a in this form of the invention is shown as provided with grooves 74 to permit passage of air past the ball valve, as herein set forth. This construction is important where only a small movement is imparted to the ball valve in mechanically unseating it. The ball valve 36a is provided with a depending portion 37, Figs. 5 and 6, this portion being the same as the correspondingly numbered part shown in Figs. 1 to 4. In Fig. 8, however, there is shown a slight modification in which the depending portion is numbered 37a and is connected to portions of the member 35a in such manner that there is not only provision for relative vertical movement therebetween, but also a pin 38a, corresponding generally to the pin 38, is connected by a light tension spring 75 with a cross member 76 positioned in a depressed or slotted portion of the member 35a. Thus, the tension spring 75 tends resiliently to draw the ball valve 36a off its seat. This construction is particularly useful when the entire structure is inverted with respect to the position shown in Fig. 8 during the charging of the mold and may then be used with the parts otherwise as shown in that figure. Also, the pin 38a extends loosely through vertically extending slots not only in the portion 37a, but also in the side portions of the member 35a to permit of the necessary movements of the parts.

A further difference between the construction shown in Figs. 5 to 8 and that of Figs. 1 to 4 is that the ball valve 36a is not provided with any upstanding stem. Furthermore, the upper portion of the neck pin structure, here the member 72, is provided with a counterbore 77 above the seat for the ball valve, which is connected with the depression 21 in the central part of the end of the neck pin by a plurality of fine bores 78.

A further difference between the form of the invention hereinbefore described and that shown in Figs. 5 to 8 is in the type of valve used in the combined settle blowing head and counterblow baffle, this head and baffle being indicated by the reference character 57a and being carried by the arm 59, as heretofore described. In this case, the valve 64 may be of the same form as that previously described, and has a stem 65 extending up through a relatively large bore 63 in the head 57a and provided with a washer or abutment 66 at its upper end. In this case, however, there is no spring corresponding to that shown at 67 in Figs. 2 and 3, but the valve is normally held open by gravity, as shown in Fig. 6, the washer 66 resting upon inwardly extending portions 79 of the head, Fig. 9. The washer 66 is of somewhat smaller diameter than a counterbore 80 in which it is located, so that while the valve is at its lowermost position, as shown in Fig. 6, pressure may pass around the washer 66 and into recessed portions 81, Fig. 9, in the portion of the head below the counterbore 80 and below the lower position of the washer 66, as seen in Fig. 6. Thus, at the lower position of the valve, pressure may flow freely past the valve when it is supplied through the passage 62. If, however, pressure is cut off through the passage 62, there are no mechanical means in this form of the invention for forcing the valve shut. This operation is effected, however, by the contact of the glass with the valve 64, the glass engaging the underside of the valve and forcing it to its closed position, as shown in Fig. 7.

This construction permits a somewhat different mode of operation than that possible for the construction as shown in Figs. 1 to 4, in that it is possible not only to form a cavity in the glass as previously described and as shown in Figs. 2, 4, 6 and 8, but also counterblowing pressure may be supplied to this cavity to expand the glass into conformity with the mold cavity prior to the cessation of the application of settle blowing pressure. This may be done by using a somewhat higher pressure for counterblowing than that used for settle blowing, the difference preferably being in the order of magnitude of 10 pounds per square inch. Thus, for example, I may use air at a pressure of 20 pounds per square inch gauge for settle blowing glass and a pressure of 30 pounds per square inch gauge for counterblowing the glass, there being a ten pound differential which will be effective to expand glass from the form shown in Fig. 6 to that shown in Fig. 7.

This operation has a certain advantage not possessed by any prior art device to my knowledge, as in the former practice of forming glass articles, there is, of course, air at some pressure in the cavity of the mold outside the blank at the time the counterblowing pressure is applied to expand it to conform to the mold cavity. This outside or back pressure is relieved by leakage through the joints between the mold parts, so that the actual pressure, that is the differential between the pressure inside and that outside is a function of the tightness of the mold parts and is indeterminate, the back pressure in a mold with the parts fitting nicely being greater than that after the same mold parts have worn. By the use of the present construction, however, the back pressure effective during the expansion of the glass is predetermined as it is the settle blowing pressure, this pressure being continuously effective and constant as the valve 64 is open until the glass engages it and closes it at the final part of the expansion thereof. For certain operations, this accurate control of back pressure is superior.

Also, when using my novel arrangements as it is unnecessary accurately to time the cessation of settle blowing, the timing of the operations can be more effectively accomplished and settle blowing pressure may be cut off at any time after the glass has been expanded to conformity with the mold, which is usually but a fraction of a second after the counterblowing pressure has been applied.

Another advantageous operation or process which can be practiced with the construction of Figs. 5 to 8, is that the descent of a glass charge into the mold may be retarded by the use of blowing pressure applied through the lower end of the mold, in this instance through the neck pin. When articles are being made having little or no shoulder portions, such as the parison shown in Figs. 5 to 8, it may be that the charge of glass will have enough momentum to move into the mold at too great a speed. This is particularly true in the making of semi-wide mouth and wide mouth articles with a machine corresponding as to general cycle to the "I. S. machine", or with narrow neck type machines.

Under these circumstances, I find it desirable to supply a small amount of pressure to the interior of the mold at the time the glass is entering it, which will serve to retard the downward movement of the glass and break the momentum thereof, so that subsequent operations may be carried on more advantageously. This may be done by the provision of a long button as shown at 14 on the drum 13 in advance of the principal application of counterblowing pressure. This will cause a small amount of pressure to flow through the neck pin past the ball valve 36a, so as to develop a pressure within the mold sufficient to retard the fall of the charge thereinto. After the button 14 has passed the lever 11 and the latch 17, pressure within the neck pin structure 19a is again vented through the valve in the timer and the ball valve member 36a will return to its lower open position even if it has meanwhile been closed. The operations thereafter may take place substantially as previously described in that subsequently counterblowing pressure (the principal counterblow pressure application) is supplied to the interior of the neck pin structure 19a under control of the short button 15. This will cause a further small amount of pressure to flow through the neck pin to form a cavity in the glass, as shown in Figs. 6 and 8, and thereby prevent skin-forming contact of the glass with the central part of the end of the neck pin. Thereafter, the valve 36a will be forced to its seat, cutting off further flow of pressure until this valve is mechanically moved to its lower position, shown in Fig. 7, at which time counterblowing pressure will be supplied through the neck pin without further operation of the timber in controlling counterblowing pressure, the control by the timer being effective, however, to vent the pressure through the pipe 50 and permit the downward movement of the piston 48 and the ball valve 36a under the action of the springs 53, Fig. 10. As above stated, this operation may take place prior to the cessation of the application of settle blowing pressure, the glass being expanded by the differential between these two pressures.

While the timer particularly employed with the present commercial "I. S. machine" is adapted for the use of air at but one pressure, that is the supplying of air is from a single source to all the valves, the counterblowing valve or settle blow valve may be supplied with air at a different pressure by the use of a timer, as disclosed particularly in the Ingle Patent 1,843,159, see Fig. 32 thereof, wherein certain of the valves are segregated from the others and supplied with air at different pressures from that supplied to other of the valves.

It will be understood that the head 57a may be used with the structure shown in Figs. 1 to 4; or the head 57 may be used, if desired, with the remaining structure shown in Figs. 5 to 8. Other variations from the construction and particular details of process will suggest themselves to those skilled in the art. I do not wish to be limited, therefore, except by the scope of the appended claims which are to be construed as broadly as the state of the prior art permits.

I claim:

1. In the manufacture of hollow glass articles, the process which comprises the steps of supplying a charge of plastic glass to a body mold and a cooperating neck ring and neck pin through the end of the body mold opposite the neck ring, admitting a relative small amount of a gaseous fluid under pressure through the neck pin independently of the supplying of glass to or the presence thereof in the body mold and prior to the glass having been in the mold long enough for any skin to form thereon opposite the neck pin and thereby forming a cavity in the glass opposite the end of the neck pin, thereafter forcing the glass longitudinally of the body mold to fill the cavity in the neck ring around the neck pin by differential pressure applied to the opposite ends of the glass while retaining in the cavity in the glass at the end of the neck pin formed as aforesaid gaseous fluid under sufficient pressure to prevent the collapse thereof, and thereafter applying further pressure to expand the glass into conformity ith the internal configuration of the body mold.

2. In the manufacture of hollow glass articles, the process which comprises the steps of supplying a charge of plastic glass to an inverted body mold and cooperating neck ring and neck pin associated with the lower end thereof through the open upper end of the mold, admitting a relatively small amount of a gaseous fluid under pressure through the neck pin at substantially the same time the charge of glass is supplied to the mold but independently of such glass supply to form a cavity in the glass opposite the end of the neck pin preventing the formation of a skin on this portion of the glass, thereafter settle blowing the glass by the admission of pressure through the upper end of the mold to move the glass downwardly therein and to cause it to fill the cavity in the neck ring and around the neck pin while still retaining the cavity formed as aforesaid at the end of the neck pin, and applying further pressure through the neck ring to expand the glass into conformity with the internal configuration of the body mold.

3. In the manufacture of hollow glass articles, the process which comprises the steps of supplying a charge of plastic glass to a body mold and a cooperating neck ring, applying pneumatic pressure to settle blow the charge in the mold and neck ring, and at least initiating the application of counterblowing pressure to expand the glass into conformity with the internal configuration of the body mold prior to the termination of the application of settle blowing pressure as aforesaid, the pressure used for counterblowing being in excess of that used for settle blowing.

4. In the manufacture of hollow glass articles, the process which comprises the steps of supplying a charge of plastic glass to an inverted body mold and a cooperating neck ring through the open upper end of the mold, supplying settle blowing pressure through the upper end of the body mold to settle the glass therein and in the neck ring and around a neck pin associated with the neck ring, and at least initiating the application of counterblowing pressure supplied through the neck pin to expand the glass into conformity with the internal configuration of the body mold prior to the termination of the application of settle blowing pressure as aforesaid, the pressure used for counterblowing being in excess of that used for settle blowing.

5. In the manufacture of hollow glass articles, the process which comprises the steps of supplying a charge of plastic glass to a body mold and a cooperating neck ring, applying pneumatic pressure to settle blow the charge in the mold and neck ring, at least initiating the application of counterblowing pressure to expand the glass into conformity with the internal configuration of the body mold prior to the termination of the application of settle blowing pressure as aforesaid, the pressure used for counterblowing being in excess of that used for settle blowing, and terminating the application of settle blowing pressure prior to the cessation of the application of counterblowing pressure as aforesaid.

6. In the manufacture of hollow glass articles, the process which comprises the steps of supplying a charge of plastic glass to a body mold and a cooperating neck ring, applying a combined settle blow head and baffle to the end of the body mold through which the charge was supplied, said head having therein a poppet valve which in open position extends into the mold cavity and in closed position forms a part of the baffle closure for the end of the mold cavity through which the charge was supplied, applying settle blowing pressure through said head and said valve to settle blow the glass in the mold and the neck ring, and at least initiating the application of counterblowing pressure to expand the glass into conformity with the internal configuration of the body mold prior to the termination of the application of settle blowing pressure as aforesaid, the pressure used for counterblowing being in excess of that used for settle blowing, and the expansion of the glass by the counterblowing pressure causing it mechanically to engage and close said valve, whereby to provide a continuously open vent and a constant back pressure during the counterblowing expansion of the glass to conformity with the mold.

7. In the manufacture of hollow glass articles, the process which comprises the steps of supplying a charge of plastic glass to an inverted body mold and a cooperating neck ring and neck pin, applying to the open upper end of the body mold subsequent to the supplying of a charge thereto a combined settle blowing head and counterblowing baffle having therein a poppet type valve, the head of which in its open position projects into the mold cavity and which when closed forms a part of the baffle closing the end of the mold cavity through which the charge was introduced, applying settle blowing pressure through the settle blow head and while the valve is open to settle the glass in the mold and neck ring, initiating the application of counterblowing pressure to expand the glass into conformity with the internal configuration of the body mold prior to the termination of the application of settle blowing as aforesaid and thereby causing the glass to engage and mechanically close said valve, the pressure used for counterblowing being in excess of that used for settle blowing, the maintenance of the valve open and the continued application of settle blowing pressure during the counterblowing providing a constant back pressure and vent for the upper portion of the mold during the expansion of the glass by the counterblowing pressure as aforesaid, and terminating the application of settle blowing pressure to said head prior to the termination of the application of counterblowing pressure but after the glass has been expanded into conformity with the mold cavity and said valve has been closed.

8. In the manufacture of hollow glass articles, the process which comprises the steps of supplying a charge of plastic glass to a body mold and a cooperating neck ring and neck pin through the end of the body mold opposite the neck ring, admitting a relatively small amount of a gaseous fluid under pressure into the mold cavity through the neck pin at a time predetermined in relation to the time the glass charge arrives in the mold, subsequently admitting a second relatively small amount of a gaseous fluid under pressure through the neck pin and thereby forming a cavity in the glass opposite the end of the neck pin to prevent skin-forming contact between the glass and the central part of the end of the neck pin, settling the glass in the body mold and neck ring and around the neck pin while maintaining the cavity formed as aforesaid, and counterblowing the glass to expand it into conformity with the internal configuration of the body mold.

9. In the manufacture of hollow glass articles of the semi-wide mouth and wide mouth types, the process which comprises the steps of supplying a charge of plastic glass to an inverted body mold and a neck ring and neck pin associated with the lower end thereof through the upper end of the body mold, retarding the downward movement of the glass in the mold by supplying a small amount of a gaseous fluid under pressure into the mold cavity at substantially the time the charge is moving downwardly through the mold cavity, subsequently admitting a small amount of a gaseous fluid under pressure through the neck pin to form a cavity in the glass opposite the end of the neck pin and thereby to prevent skin-forming contact between the glass and the central portion of the end of the neck pin, settling the glass in the body mold and the neck ring and around the neck pin while maintaining the cavity therein formed as aforesaid, and counterblowing the glass to expand it into conformity with the internal configuration of the body mold.

10. In the manufacture of hollow glass articles of the wide mouth and semi-wide mouth types, the proess which comprises the steps of supplying a charge of plastic glass to an inverted body mold and a cooperating neck ring and neck pin through the open upper end of the mold, retarding the downward movement of the glass through the body mold as it is supplied thereto by admitting a small amount of a gaseous fluid under pressure into the mold cavity through the neck pin, admitting a second small amount of a gaseous fluid under pressure through the neck pin subsequent to the glass having been supplied to the mold to form a cavity in the glass opposite the end of the neck pin and thereby preventing skin-forming contact between the glass and the central portion of the end of the neck pin, supplying settle blowing pressure to the mold cavity from above to settle the glass in the mold and in the cavity of the neck ring around the neck pin while maintaining the cavity formed in the glass as aforesaid, subsequently but prior to the cessation of the application of settle blowing pressure as aforesaid admitting counterblowing pressure through the neck pin to expand the glass into conformity with the internal cavity of the body mold, the counterblowing pressure being in excess of that used for settle blowing, and terminating the application of settle blowing pressure prior to the termination of the application of counterblowing pressure as aforesaid.

11. Apparatus for forming hollow glass articles, comprising a body mold adapted to be supplied with charges of plastic glass, a neck ring and a neck pin associated with one end of said mold, means operating independently of the glass for supplying a relatively small amount of a gaseous fluid under pressure through said neck pin to form a cavity in a charge of glass supplied to said mold to prevent skin-forming contact between the glass and the central portion of the end of said neck pin, means for causing the glass to move longitudinally of said mold to fill the cavity of said neck ring and around said neck pin while maintaining the cavity formed as aforesaid, and means for expanding the glass into conformity with the internal cavity of said mold.

12. Apparatus for forming hollow glass articles, comprising a body mold adapted to be supplied with charges of plastic glass, a neck ring associated with one end of said mold, a neck pin structure having a neck pin associated with said neck ring, a valve in said neck pin structure so constructed and arranged that it is always to be out of contact with glass in said mold and that on the supplying of counterblowing pressure to said neck pin structure, a small amount of pressure will flow past said valve and through said neck pin and the continued application of pressure will cause said valve to seat and remain seated as long as said pressure is continuously applied, other valve means for initiating and cutting off the supply of counterblowing pressure, means for causing glass to move longitudinally of said mold to fill the cavity of said neck ring and around said neck pin, and means for mechanically unseating and bodily moving the valve in said neck pin structure during the continued application of counterblowing pressure thereto to permit the flow of counterblowing pressure through said neck pin to expand the glass into conformity with said mold.

13. Apparatus for forming hollow glass articles, comprising a body mold adapted to be supplied with charges of plastic glass, a neck ring associated with one end of said mold, a neck pin structure including a neck pin associated with said neck ring, a valve disposed in said neck pin structure and arranged when seated to close a passage therethrough, resilient means tending to hold said valve in its unseated position, means including a second valve for supplying counterblowing pressure to the interior of said neck pin structure, the valve in said neck pin structure being so constructed and arranged that upon the supplying of counterblowing pressure to the interior of the neck pin structure, a small amount of said pressure will flow past the valve therein and through the neck pin to form a cavity in the glass opposite the end of the neck pin and thereby to prevent skin-forming contact between the glass and the central portion of the end of the neck pin, while further pressure will cause seating of said valve against said resilient means tending to hold it open, means for causing a movement of the glass longitudinally of said mold toward the neck ring and the neck pin to cause it to fill the cavity of the neck ring around the neck pin while maintaining the cavity between the glass and the end of the neck pin formed as aforesaid, and means for mechanically unseating the valve in the neck pin structure to permit counterblowing pressure to flow through the neck pin for expanding the glass into conformity with said mold.

14. Apparatus for forming hollow glass articles, comprising an inverted body mold adapted to be supplied with charges of plastic glass, a neck ring associated with the lower end of said mold, a neck pin structure including a neck pin associated with said neck ring, said neck pin structure and said neck pin having a passage therethrough for counterblowing pressure, a portion of said passage being formed as a valve seat, a valve in said neck pin structure movable to and from a position on said seat and so constructed and arranged as to be held by gravity off said seat when counterblowing pressure is not being supplied to the interior of said neck pin structure and, upon the supplying of counterblowing pressure, to permit a small amount of such pressure to flow past the valve through said neck pin structure and said neck pin before the valve is seated to form a cavity in the glass opposite the end of the neck pin preventing skin-forming contact between the glass and the central portion of the end of the neck pin, and immediately thereafter to be seated by the continued application of counterblowing pressure, means including a second valve for controlling the application of counterblowing pressure to said neck pin structure, settle blowing means arranged to be associated with the upper end of said mold for supplying settle blowing pressure thereto, means for mechanically unseating the valve in said neck pin structure to permit counterblowing pressure to flow therethrough for expanding the glass into conformity with the body mold, and means for moving said neck pin structure bodily to and from its position in association with said neck ring.

15. Apparatus for forming hollow glass articles, comprising a body mold adapted to be supplied with charges of plastic glass, a neck ring and a neck pin associated with one end of said mold, means operating independently of the glass for supplying a relatively small amount of gaseous fluid under pressure through said neck pin in timed relation to the supplying of a charge of glass to said mold, means differing in part at least from the last named means for supplying a second small amount of gaseous fluid under pressure through said neck pin and thereby for insuring the formation of a cavity in the glass opposite the end of the neck pin to prevent skin-forming contact between the glass and the central portion of the end of the neck pin, means for settling the glass in the mold and into the cavity in the neck ring around the neck pin while maintaining the cavity in the glass formed as aforesaid, and means for applying counterblowing pressure to the glass to expand it into conformity with said mold.

16. Apparatus for forming hollow glass articles of the semi-wide mouth and wide mouth types, comprising an inverted body mold adapted to be supplied with charges of plastic glass through its open upper end, a neck ring and a neck pin associated with the lower end of said mold, a neck pin structure of which said neck pin forms a part, a valve in said neck pin structure arranged to be actuated by pressure flowing therethrough, said neck pin structure having a passage controlled by said valve through the interior thereof and through the upper end of said neck pin, means for retarding the fall of a charge of glass in said mold including means for supplying a relatively small amount of pressure through said neck pin structure and said neck pin past said valve, means including certain of the last named means for controlling the supplying of counterblowing pressure to said neck pin structure, the valve in the neck pin structure being so constructed and arranged that when counterblowing pressure is continuously supplied to the interior thereof, a small amount of such pressure will flow past said valve through said neck pin and the continued application of pressure will cause the seating of said valve, cutting off further flow of pressure through the neck pin, means for settling the glass in said mold and said neck ring and around said neck pin, and means for mechanically unseating said valve to permit the pressure within said neck pin structure to flow freely through said neck pin to expand the glass into conformity with said mold.

GEORGE E. ROWE.